US012724955B2

(12) United States Patent
Jeon et al.

(10) Patent No.: US 12,724,955 B2
(45) Date of Patent: Sep. 1, 2026

(54) TOUCH SCREEN-BASED ELECTRONIC APPARATUS ENABLING HYPERLINK BETWEEN ELECTRONIC DOCUMENTS ON BASIS OF TOUCH INPUT, AND OPERATION METHOD THEREOF

(71) Applicant: FLEXCIL INC., Seongnam-si (KR)

(72) Inventors: Sung Phil Jeon, Seongnam-si (KR); Chang Rok Lim, Seongnam-si (KR); Ji Hoon Park, Seongnam-si (KR)

(73) Assignee: FLEXCIL INC., Seongnam-si (KR)

( * ) Notice: Subject to any disclaimer, the term of this patent is extended or adjusted under 35 U.S.C. 154(b) by 411 days.

(21) Appl. No.: 18/577,277

(22) PCT Filed: Jul. 22, 2022

(86) PCT No.: PCT/KR2022/010768

§ 371 (c)(1),
(2) Date: Jul. 1, 2024

(87) PCT Pub. No.: WO2023/008839

PCT Pub. Date: Feb. 2, 2023

(65) Prior Publication Data

US 2025/0322144 A1 Oct. 16, 2025

(30) Foreign Application Priority Data

Jul. 26, 2021 (KR) ........................ 10-2021-0097531

(51) Int. Cl.
*G06F 40/134* (2020.01)
*G06F 3/0483* (2013.01)
(Continued)

(52) U.S. Cl.
CPC .......... *G06F 40/134* (2020.01); *G06F 3/0483* (2013.01); *G06F 3/0488* (2013.01); *G06F 40/166* (2020.01)

(58) Field of Classification Search
CPC .... G06F 40/134; G06F 40/166; G06F 3/0483; G06F 3/0488
See application file for complete search history.

(56) References Cited

U.S. PATENT DOCUMENTS 6,560,620 B1 * 5/2003 Ching .................. G06V 30/416 707/999.203
6,658,626 B1 * 12/2003 Aiken .................. G06F 40/289 715/205
(Continued)

FOREIGN PATENT DOCUMENTS

JP H11-328174 A 11/1999
JP 2011-128945 A 6/2011
(Continued)

OTHER PUBLICATIONS

International Search Report in International Application No. PCT/KR2022/010768, dated Oct. 21, 2022, 3 pages.
(Continued)

*Primary Examiner* — Tadesse Hailu
(74) *Attorney, Agent, or Firm* — Park, Kim & Suh, LLC

(57) ABSTRACT

The present invention provides a touch screen-based electronic apparatus that enables hyperlinks between electronic documents based on a touch input, and the operating method thereof to support a user to quickly find required information for the electronic document through a hyperlink set in the electronic document.

11 Claims, 8 Drawing Sheets

(51) Int. Cl.
*G06F 3/0488* (2022.01)
*G06F 40/166* (2020.01)

(56) References Cited

U.S. PATENT DOCUMENTS

| | | | | |
|---|---|---|---|---|
| 6,978,420 | B2 * | 12/2005 | Ching | G06F 16/748<br>715/256 |
| 7,975,223 | B2 * | 7/2011 | Plumley | G06F 40/197<br>715/255 |
| 2005/0149851 | A1 | 7/2005 | Mittal | |
| 2007/0294610 | A1 * | 12/2007 | Ching | G06F 16/94 |
| 2016/0055196 | A1 * | 2/2016 | Collins | G06F 16/93<br>707/690 |

FOREIGN PATENT DOCUMENTS

| | | | |
|---|---|---|---|
| KR | 10-2022-0017970 | A | 3/2002 |
| KR | 10-2003-0038933 | A | 5/2003 |

OTHER PUBLICATIONS

Naver Blog post entitled "How to easily set up Korean hyperlink and bookmark functions" 24 page, posted Aug. 9, 2019 by user "Street at Dawn", Retrieved from Internet: <https://blog.naver.com/neoissue5/221610427234>.

* cited by examiner

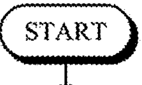

S810: CONFIRM, WHEN WHILE FIRST DOCUMENT FILE AND SECOND DOCUMENT FILE AMONG PLURALITY OF DOCUMENT FILES STORED IN ELECTRONIC APPARATUS ARE EXECUTED BY USER, FIRST PAGE OF FIRST ELECTRONIC DOCUMENT CORRESPONDING TO FIRST DOCUMENT FILE AND SECOND PAGE OF SECOND ELECTRONIC DOCUMENT CORRESPONDING TO SECOND DOCUMENT FILE ARE SIMULTANEOUSLY DISPLAYED ON SCREEN, INSTRUCTION INSTRUCTING HYPERLINK OF FIRST POINT OF FIRST PAGE AND SECOND POINT OF SECOND PAGE TO BE SET IS APPLIED FROM USER, POSITIONAL INFORMATION OF FIRST POINT ON FIRST PAGE, POSITIONAL INFORMATION OF SECOND POINT ON SECOND PAGE, INFORMATION ON PAGE NUMBER OF FIRST PAGE, INFORMATION ON PAGE NUMBER OF SECOND PAGE, AND INFORMATION ON STORAGE PATH IN WHICH SECOND DOCUMENT FILE IS STORED

S820: GENERATE FIRST HYPERLINK DATA WHICH INCLUDES POSITIONAL INFORMATION OF FIRST POINT, POSITIONAL INFORMATION OF SECOND POINT, INFORMATION ON PAGE NUMBER OF FIRST PAGE, INFORMATION ON PAGE NUMBER OF SECOND PAGE, AND INFORMATION ON STORAGE PATH OF SECOND DOCUMENT FILE WHEN POSITIONAL INFORMATION OF FIRST POINT, POSITIONAL INFORMATION OF SECOND POINT, INFORMATION ON PAGE NUMBER OF FIRST PAGE, INFORMATION ON PAGE NUMBER OF SECOND PAGE, AND INFORMATION ON STORAGE PATH OF SECOND DOCUMENT FILE ARE CONFIRMED

S830: WHEN FIRST HYPERLINK DATA IS GENERATED, ADD FIRST HYPERLINK DATA TO FIRST DOCUMENT FILE

S840: LOAD FIRST PAGE AND DISPLAY FIRST PAGE ON SCREEN, AND CONFIRM POSITIONAL INFORMATION OF FIRST POINT IN FIRST HYPERLINK DATA INCLUDED IN FIRST DOCUMENT FILE, AND THEN DISPLAY PREDETERMINED NOTIFICATION INDICATOR INDICATING THAT HYPERLINK IS SET ON FIRST POINT OF FIRST PAGE DISPLAYED IN SCREEN WHEN LOAD INSTRUCTION FOR FIRST PAGE OF FIRST ELECTRONIC DOCUMENT IS APPLIED BY USER AFTER FIRST HYPERLINK DATA IS ADDED TO FIRST DOCUMENT FILE

S850: WHEN NOTIFICATION INDICATOR IS DISPLAYED ON FIRST POINT, AND THEN DISPLAY INSTRUCTION FOR HYPERLINK SET IN FIRST POINT IS APPLIED BY USER, CONFIRM INFORMATION ON STORAGE PATH OF SECOND DOCUMENT FILE IN FIRST HYPERLINK DATA, AND EXECUTE SECOND DOCUMENT FILE, AND CONFIRM INFORMATION ON PAGE NUMBER OF SECOND PAGE IN FIRST HYPERLINK DATA AND LOAD SECOND PAGE TO SIMULTANEOUSLY DISPLAY FIRST PAGE AND SECOND PAGE ON SCREEN

END

TOUCH SCREEN-BASED ELECTRONIC APPARATUS ENABLING HYPERLINK BETWEEN ELECTRONIC DOCUMENTS ON BASIS OF TOUCH INPUT, AND OPERATION METHOD THEREOF

CROSS-REFERENCE TO RELATED APPLICATIONS

This application is a National Phase Application of PCT International Application No. PCT/KR2022/010768, which was filed on Jul. 22, 2022, and which claims priority from Korean Patent Application No. 10-2021-0097531 filed on Jul. 26, 2021. The disclosures of the above patent application are incorporated herein by reference in their entirety.

TECHNICAL FIELD

The present invention relates to a touch screen-based electronic apparatus that enables hyperlinks between electronic documents based on a touch input and the operating method thereof.

BACKGROUND ART

In recent years, as a computer, a smart phone, a tablet PC, or the like have widely propagated, various types of electronic document related programs have been released, which enable reading, preparing, and editing the electronic document by using the electronic devices.

Usually, when editing an electronic document, a user opens another electronic document and then edits it while both electronic documents are displayed on the screen at the same time in order to refer to the contents of other electronic documents related to the electronic document.

If the user can set a hyperlink between two electronic documents containing related content, the user can check the hyperlink set in the electronic document when editing a specific electronic document later and by executing the hyperlink, the user can easily open another electronic document containing content related to the electronic document, and edit the document with both electronic documents displayed simultaneously on the screen.

In this way, if it is possible to set a hyperlink between two electronic documents, the user can more easily and quickly find the contents of other electronic documents related to the electronic document when editing the electronic document, which in turn, and this will have the effect of increasing user convenience for electronic document editing.

Therefore, research is needed on technology that enables hyperlinks between electronic documents based on touch input.

DISCLOSURE

Technical Problem

The present invention provides a touch screen-based electronic apparatus that enables hyperlinks between electronic documents based on a touch input, and the operating method thereof to support a user to quickly find required information for the electronic document through a hyperlink set in the electronic document.

Technical Solution

A touch screen-based electronic apparatus that enables hyperlinks between electronic documents based on a touch input includes: a confirmation unit confirming, when while a first document file and a second document file among a plurality of document files stored in an electronic apparatus are executed by the user, a first page of a first electronic document corresponding to the first document file and a second page of a second electronic document corresponding to the second document file are simultaneously displayed on a screen, an instruction instructing a hyperlink of a first point of the first page and a second point of the second page to be set is applied from a user, positional information of the first point on the first page, positional information of the second point on the second page, information on a page number of the first page, information on a page number of the second page, and information on a storage path in which the second document file is stored; a data generation unit generating first hyperlink data which includes the positional information of the first point, the positional information of the second point, the information on the page number of the first page, the information on the page number of the second page, and the information on the storage path of the second document file when the positional information of the first point, the positional information of the second point, the information on the page number of the first page, the information on the page number of the second page, and the information on the storage path of the second document file are confirmed; when the first hyperlink data is generated, a data addition unit adding the first hyperlink data to the first document file; a notification indicator display unit loading the first page and displaying the first page on a screen, and confirming the positional information of the first point in the first hyperlink data included in the first document file, and then displaying a predetermined notification indicator indicating that the hyperlink is set on the first point of the first page displayed in the screen when a load instruction for the first page of the first electronic document is applied by the user after the first hyperlink data is added to the first document file; and when the notification indicator is displayed on the first point, and then a display instruction for the hyperlink set in the first point is applied by the user, a simultaneous display unit confirming the information on the storage path of the second document file in the first hyperlink data, and executing the second document file, and confirming the information on the page number of the second page in the first hyperlink data and loading the second page to simultaneously display the first page and the second page on the screen.

Further, an operating method of a touch screen-based electronic apparatus that enables hyperlinks between electronic documents based on a touch input includes: confirming, when while a first document file and a second document file among a plurality of document files stored in an electronic apparatus are executed by the user, a first page of a first electronic document corresponding to the first document file and a second page of a second electronic document corresponding to the second document file are simultaneously displayed on a screen, an instruction instructing a hyperlink of a first point of the first page and a second point of the second page to be set is applied from a user, positional information of the first point on the first page, positional information of the second point on the second page, information on a page number of the first page, information on a page number of the second page, and information on a storage path in which the second document file is stored; generating first hyperlink data which includes the positional information of the first point, the positional information of the second point, the information on the page number of the first page, the information on the page number of the second page, and the information on the storage path of the second document file when the positional information of the first point, the positional information of the second point, the information on the page number of the first page, the information on the page number of the second page, and the information on the storage path of the second document file are confirmed; when the first hyperlink data is generated, adding the first hyperlink data to the first document file; loading the first page and displaying the first page on a screen, and confirming the positional information of the first point in the first hyperlink data included in the first document file, and then displaying a predetermined notification indicator indicating that the hyperlink is set on the first point of the first page displayed in the screen when a load instruction for the first page of the first electronic document is applied by the user after the first hyperlink data is added to the first document file; and when the notification indicator is displayed on the first point, and then a display instruction for the hyperlink set in the first point is applied by the user, confirming the information on the storage path of the second document file in the first hyperlink data, and executing the second document file, and confirming the information on the page number of the second page in the first hyperlink data and loading the second page to simultaneously display the first page and the second page on the screen.

Advantageous Effects

The present invention provides a touch screen-based electronic apparatus that enables hyperlinks between electronic documents based on a touch input, and the operating method thereof to support a user to quickly find required information for the electronic document through a hyperlink set in the electronic document.

DESCRIPTION OF DRAWINGS

FIGS. 2 to 7 are diagrams for describing the touch screen-based electronic apparatus that enables hyperlinks between electronic document based on a touch input according to an embodiment of the present invention.

FIG. 8 is a flowchart illustrating an operating method of a touch screen-based electronic apparatus that enables hyperlinks between electronic document based on a touch input according to an embodiment of the present invention.

BEST MODE

Figure 1:
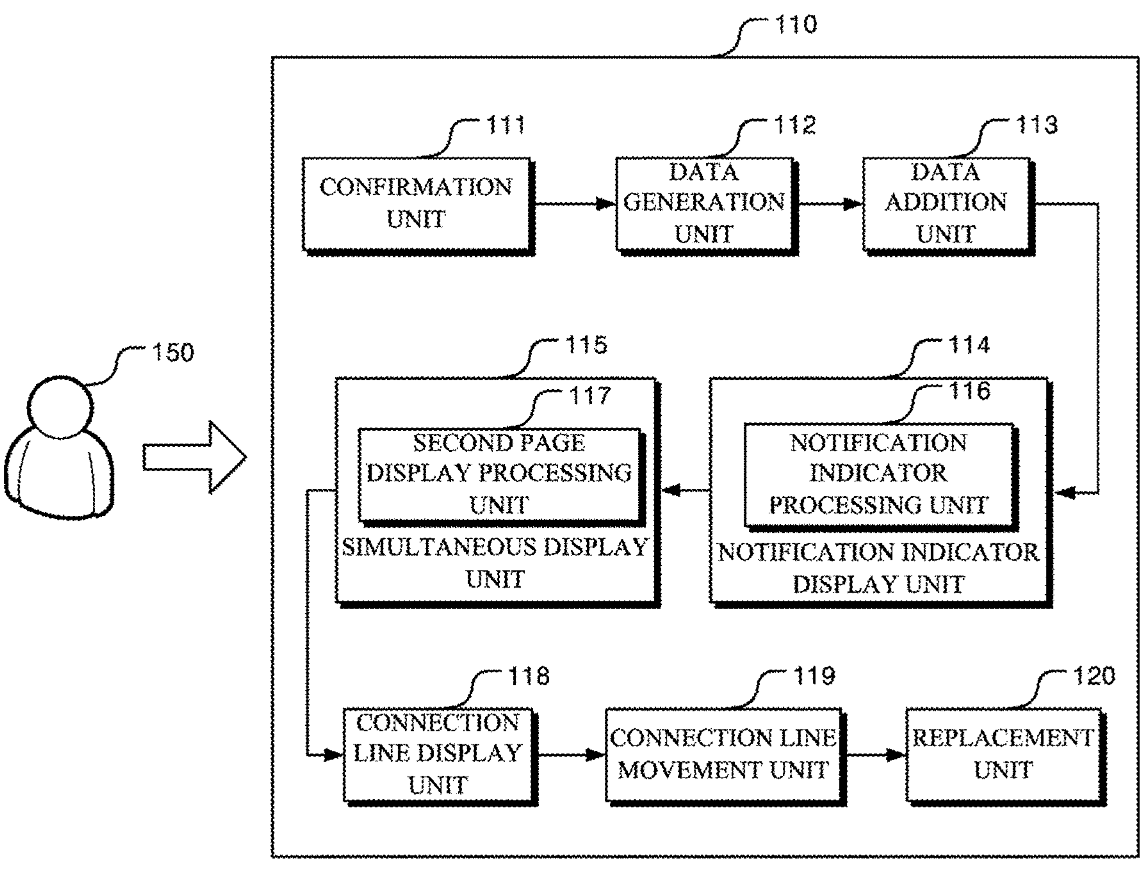
FIG. 1 is a diagram illustrating a structure of a touch screen-based electronic apparatus that enables hyperlinks between electronic document based on a touch input according to an embodiment of the present invention.

Hereinafter, exemplary embodiments of the present invention will be described in detail with reference to the accompanying drawings. The description does not limit the present invention to specific exemplary embodiments, and it should be understood that the present invention covers all the modifications, equivalents and replacements included within the idea and technical scope of the present invention. In describing each drawing, like reference numerals refer to like elements and if not contrarily defined, all terms used herein including technological or scientific terms have the same meanings as those generally understood by a person with ordinary skill in the art.

In this document, unless explicitly described to the contrary, the word "comprise" and variations such as "comprises" or "comprising", will be understood to imply the inclusion of stated elements but not the exclusion of any other elements. Further, in various exemplary embodiments of the present invention, each of components, functional blocks or means may be constituted by one or more lower components and electrical, electronic, and mechanical functions performed by respective components may be implemented as various known devices or mechanical elements including an electronic circuit, an integrated circuit, an Application Specific Integrated Circuit (ASIC), etc., and the respective components may be separately implemented or two or more components may be integrated into one and implemented.

Meanwhile, blocks of the accompanying block diagram or steps of a flowchart may be appreciated as meaning compute program instructions mounted on a processor or a memory of data processible equipment such as a universal computer, a special computer, a portable notebook computer, a network computer, etc., and performing designated functions. Since the computer program instructions may be stored in a memory provided in a computer device or a computer readable memory, functions described in blocks of a block diagram or steps of a flowchart may be produced as a manufactured object including an instruction mean performing the functions. Moreover, each block or each step may represent a part of a module, a segment, or a code that includes one or more executable instructions for executing a specified logical function(s). It should also be noted that in some replaceable embodiments, the functions mentioned in the blocks or steps may also be executed differently from a predetermined order. For example, two blocks or steps that are subsequently illustrated are substantially simultaneously carried out, or may be performed in a reverse order, and in some cases, the functions may be performed while some blocks or steps are omitted.

FIG. 1 is a diagram illustrating a structure of a touch screen-based electronic apparatus that enables hyperlinks between electronic document based on a touch input according to an embodiment of the present invention.

Referring to FIG. 1, the electronic apparatus 110 according to an embodiment of the present invention includes a confirmation unit 111, a data generation unit 112, a data addition unit 113, a notification indicator display unit 114, and a simultaneous display unit 115.

When while a first document file and a second document file among a plurality of document files stored in an electronic apparatus 110 are executed by the user 150, a first page of a first electronic document corresponding to the first document file and a second page of a second electronic document corresponding to the second document file are simultaneously displayed on a screen, an instruction instructing a hyperlink of a first point of the first page and a second point of the second page to be set is applied from a user 150, the confirmation unit 111 confirms positional information of the first point on the first page, positional information of the second point on the second page, information on a page number of the first page, information on a page number of the second page, and information on a storage path in which the second document file is stored.

Here, the electronic apparatus 110 is a touch screen-based apparatus, and the user 150 may select each of the first point of the first page and the second point of the second page as a touch input, applies a predetermined touch gesture connecting the first point and the second point, and then maintains the touch input long for a specific time to apply an instruction instructing a hyperlink of the first point of the first page and the second point of the second page to be set.

Further, the first electronic document and the second electronic document may be the same electronic document or may be different electronic documents.

The data generation unit 112 generates first hyperlink data including the positional information of the first point, the positional information of the second point, the information on the page number of the first page, the information on the page number of the second page, and the information on the storage path of the second document file when the positional information of the first point, the positional information of the second point, the information on the page number of the first page, the information on the page number of the second page, and the information on the storage path of the second document file are confirmed.

When the first hyperlink data is generated, the data addition unit 113 adds the first hyperlink data to the first document file.

When a load instruction for the first page of the first electronic document is applied by the user 150 after the first hyperlink data is added to the first document file, the notification indicator display unit 114 loads the first page and displays the first page on a screen, and confirms the positional information of the first point in the first hyperlink data included in the first document file, and then displays a predetermined notification indicator indicating that the hyperlink is set on the first point of the first page displayed in the screen.

Here, the notification indicator may be a predetermined icon or message.

When the notification indicator is displayed on the first point, and then a display instruction for the hyperlink set in the first point is applied by the user 150, the simultaneous display unit 115 confirms the information on the storage path of the second document file in the first hyperlink data, and executes the second document file, and confirms the information on the page number of the second page in the first hyperlink data and loads the second page to simultaneously display the first page and the second page on the screen.

Hereinafter, the operation of the electronic apparatus 110 will be described in detail with reference to FIGS. 2 to 7.

First, as in the drawing illustrated by reference numeral 210 in FIG. 2, it is assumed that the first document file and the second document file among the plurality of document files stored on the electronic apparatus 110 are executed by the user 150, and a first page 211 of the first electronic document corresponding to the first document file and a second page 212 of the second electronic document corresponding to the second document file are simultaneously displayed on the screen.

Figure 2:
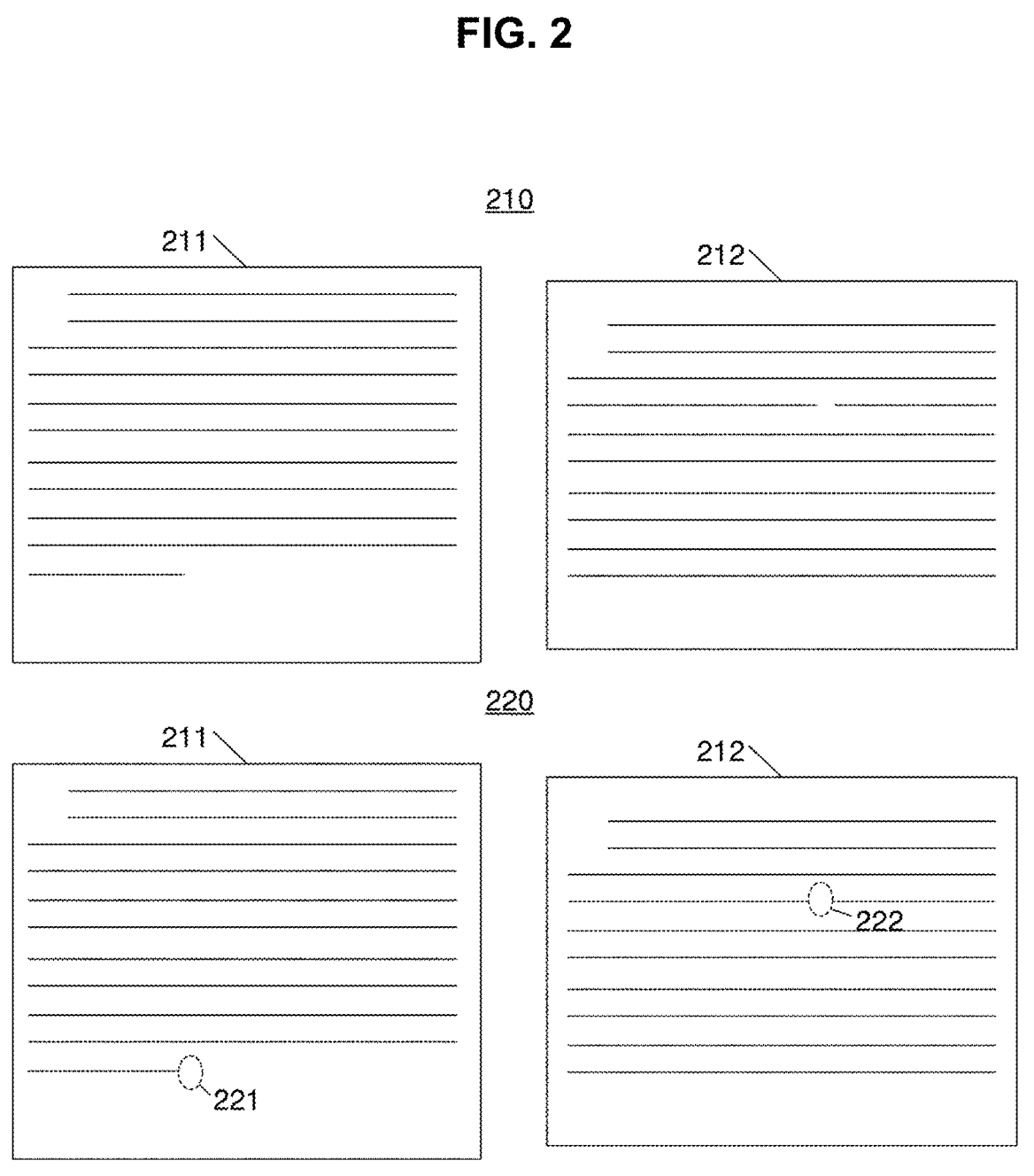

In this case, as in the drawing illustrated in reference numeral 220 of FIG. 2, when an instruction instructing a hyperlink of a first point 221 of the first page 211 and a second point 222 of the second page 212 to be set is applied from the user 150, the confirmation unit 111 may confirm positional information of the first point 221 on the first page 211, positional information of the second point 222 on the second page 212, information on a page number of the first page 211, information on a page number of the second page 212, and information on a storage path in which the second document file is stored.

In this regard, when the information on the storage path in which the second document file is stored is 'C:\flexcil\document folder\A.docx', the confirmation unit 111 may confirm the positional information of the first point 221 in the first page 211, the positional information of the second point 222 in the second page 212, the information on the page number of the first page 211, the information on the page number of the second page 212, and 'C:\flexcil\document folder\A.docx' which is the information on the storage path in which the second document file is stored.

In this way, when the confirmation unit 111 confirms the positional information of the first point 221, the positional information of the second point 222, the information on the page number of the first page 211, the information on the page number of the second page 212, and 'C:\flexcil\document folder\A.docx' which is the information on the storage path in which the second document file is stored, the data generation unit 112 may generate the first hyperlink data including the positional information of the first point 221, the positional information of the second point 222, the information on the page number of the first page 211, the information on the page number of the second page 212, and 'C:\flexcil\document folder\A.docx' which is the information on the storage path in which the second document file is stored.

In this case, according to an embodiment of the present invention, when the first hyperlink data is generated, the data addition unit 113 may generate a first unique identifier for the first hyperlink data, correspond the first unique identifier and the first hyperlink data, and add the first unique identifier and the first hyperlink data to the first document file, and at the same time, insert the first unique identifier into page data for the first page 211.

In this case, when the load instruction for the first page 211 of the first electronic document is applied by the user 150, the notification indicator display unit 114 may load the first page 211 and display the loaded first page 211 on the screen, search the first hyperlink data included to correspond to the first unique identifier in the first document file based on the first unique identifier inserted into the page data for the first page 211, and then confirm the positional information of the first point 221 in the searched first hyperlink data, and display a notification indicator indicating that the hyperlink is set on the first point 221 of the first page 211 displayed in the screen.

Figure 3:
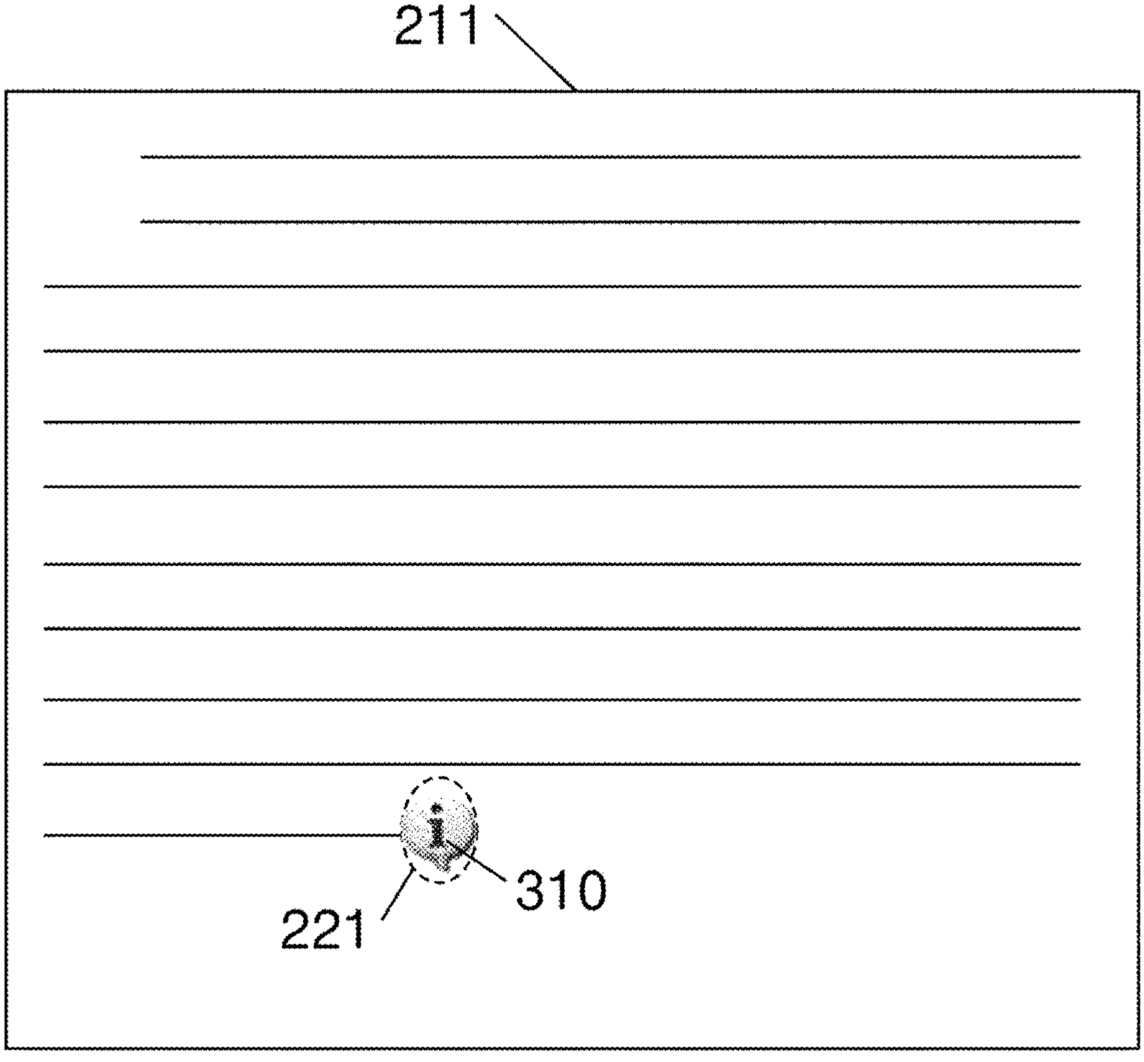

In this case, when the load instruction for the first page 211 of the first electronic document is applied by the user 150 after the first hyperlink data is added onto the first document file through the data addition unit 113, the notification indicator display unit 114 may load the first page 211 and display the loaded first page 211 on the screen, search the first hyperlink data included to correspond to the first unique identifier in the first document file based on the first unique identifier inserted into the page data for the first page 211, and then confirm the positional information of the first point 221 from the searched first hyperlink data, and display a notification indicator 310 indicating that the hyperlink is set on the first point 221 of the first page 211 displayed in the screen, as in the drawing illustrated in FIG. 3.

In this case, according to an embodiment of the present invention, the notification indicator display unit 114 may include a notification indicator processing unit 116.

The notification indicator processing unit 116 displays the notification indicator 310 on the first point 221 of the first page 211 for a predetermined first time, processes the notification indicator 310 to disappear on the first point 221 through a graphic effect when the first time elapsed, displays the notification indicator 310 on the first point 221 for the first time again when a pointing input is generated from the first point 221 within a predetermined distance by the user 150 after the notification indicator 310 disappears on the first point 221, and processes the notification indicator 310 to disappear on the first point 221 again through the graphic effect when the first time elapsed.

Here, the pointing input means a touch input generated according to the touch of the user.

For example, when the predetermined first time is '3 seconds', the notification indicator processing unit 116 may display the notification indicator 310 on the first point 221 of the first page 211 for '3 seconds' when the first page 211 is loaded and displayed on the screen, and process the notification indicator 310 to disappear on the first point 221 through the graphic effect when '3 seconds' elapsed.

Then, the notification indicator processing unit 116 may display the notification indicator 310 on the first point 221 again for '3 seconds' when the pointing input is generated from the first point 221 within the predetermined distance by the user 150 after the notification indicator 310 disappears on the first point 221, and process the notification indicator 310 to disappear on the first point 221 again through the graphic effect when '3 seconds' elapsed.

Figure 4:
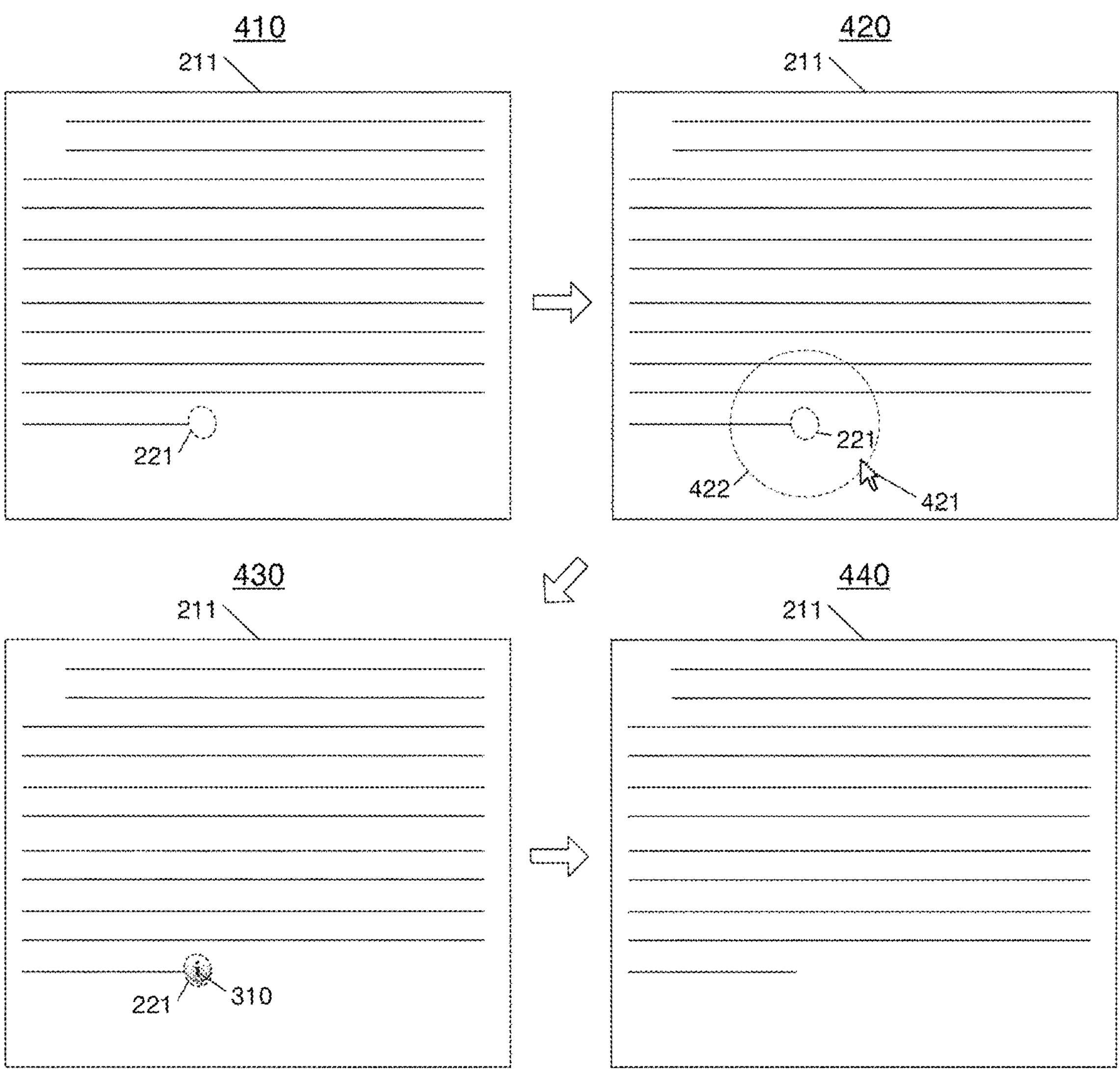

In this regard, as in the drawing illustrated in reference numeral 410 of FIG. 4, the notification indicator processing unit 116 may display the notification indicator 310 on the first point 221 again for '3 seconds' when a pointing input 421 is generated from the first point 221 within a predetermined distance 422 by the user 150 as in the drawing illustrated in reference numeral 420 of FIG. 4 after the notification indicator 310 disappears on the first point 221 as in the drawing illustrated in reference numeral 430 of FIG. 4, and process the notification indicator 310 to disappear on the first point 221 again through the graphic effect as in the drawing illustrated in reference numeral 440 of FIG. 4 when '3 seconds' elapsed.

Figure 5:
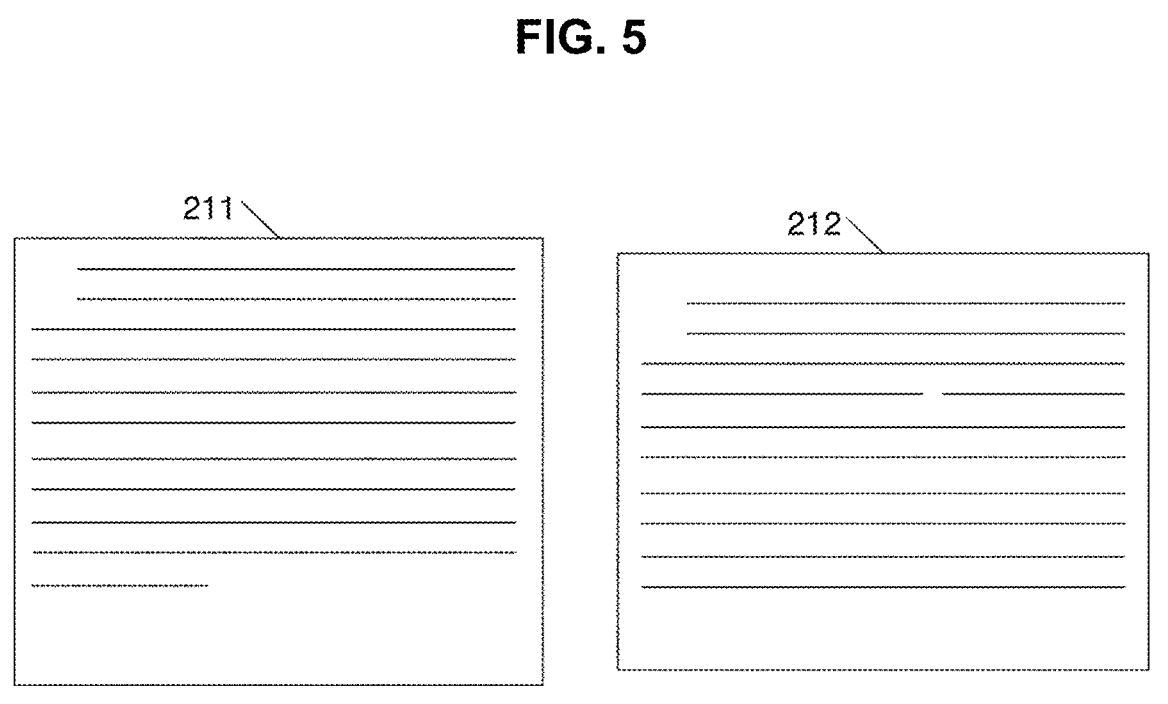

In this way, when a display instruction for the hyperlink set in the first point 221 is applied by the user 150 after the notification indicator 310 is displayed on the first point 221, the simultaneous display unit 115 may confirm 'C:\flexcil\document folder\A.docx' which is the information on the storage path of the second document file in the first hyperlink data and execute the second document file, and confirm the information on the page number of the second page 212 in the first hyperlink data, and load the second page 212, and simultaneously display the first page 211 and the second page 212 on the screen as in the drawing illustrated in FIG. 5.

In this case, according to an embodiment of the present invention, the simultaneous display unit 115 may include a second page display processing unit 117.

The second page display processing unit 117 locates an input cursor which enables a text input into the second point 222 of the second page 212 when simultaneously displaying the first page 211 and the second page 212 on the screen, and switches, when an editing object is inserted into the second point 222, the editing object inserted into the second point 222 to a selection state instead of locating the input cursor.

Here, the editing object means an item such as a figure, a table, an image, etc., which may be inserted into the electronic document.

Figure 6:
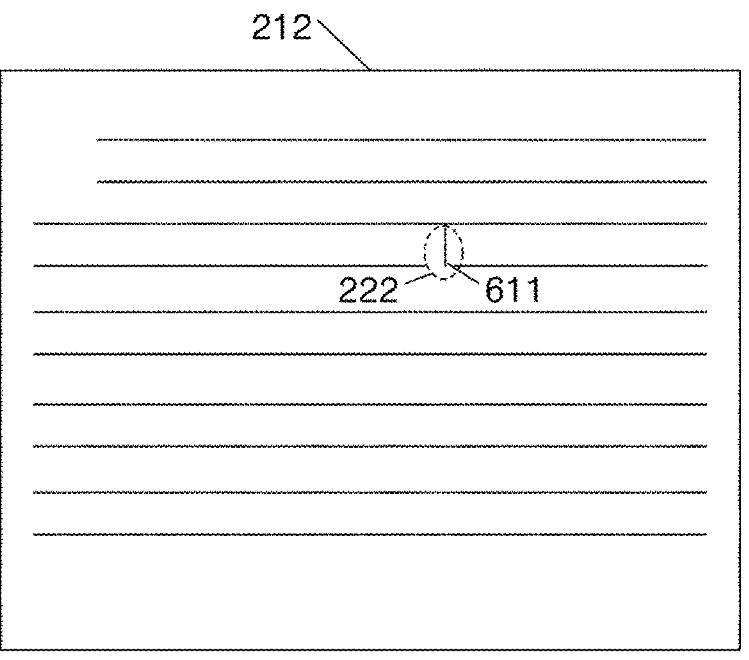

In this regard, the second page display processing unit 117 may locate an input cursor 611 which enables the text input at the second point 222 of the second page 212 as in the drawing illustrated in reference numeral 610 of FIG. 6 when simultaneously displaying the first page 211 and the second page 212 on the screen.

However, the second page display processing unit 117 may switch an editing object 621 inserted into the second point 222 to a selection state 622 instead of locating the input cursor 611 when an editing object 621 such as the figure is inserted into the second point 222 as in the drawing illustrated in the reference numeral 620 of FIG. 6.

According to an embodiment of the present invention, the electronic apparatus 110 may further include a connection line display unit 118, a connection line movement unit 119, and a replacement unit 120.

The connection line display unit 118 displays a connection line connecting the first point 221 and the second point 222 on the screen when the first page 211 and the second page 212 are simultaneously displayed on the screen through the simultaneous display unit 115.

When the second point 222 moves to a third point of the second page 212 by the pointing input of the user 150 in a state in which the first point 221 and the second point 222 are connected by the connection line, the connection line movement unit 119 moves the connection line in response to the movement to the third point.

The replacement unit 120 confirms positional information of the third point in the second page 212, and generates second hyperlink data constituted by the positional information of the first point 221, positional information of the third point, the information on the page number of the first page 211, the information on the page number of the second page 212, and the information on the storage path of the second document file, and then replaces the first hyperlink data included in the first document file with the second hyperlink data.

In this regard, as in the drawing illustrated in FIG. 5, it is assumed that the first simultaneous display unit 115.

Figure 7:
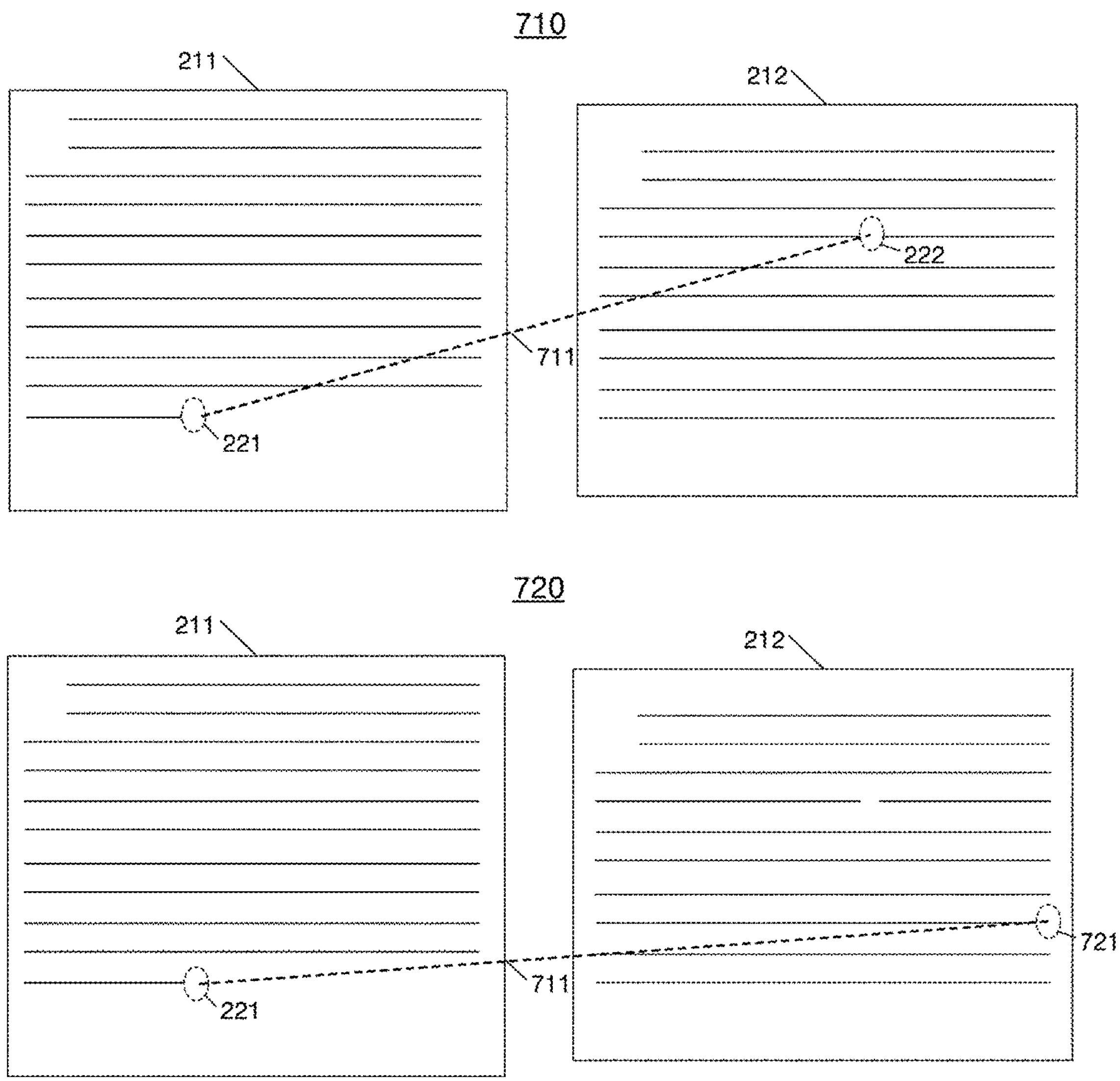

Then, the connection line display unit 118 may display, on the screen, a connection line 711 connecting the first point 221 and the second point 222 as in the drawing illustrated in reference numeral 710 of FIG. 7.

In this way, when the second point 222 moves to the third point 721 of the second page 212 by the pointing input of the user 150 as in the drawing illustrated in reference numeral 720 of FIG. 7 in the state in which the first point 221 and the second point 222 are connected by the connection line 711 as in the drawing illustrated in reference numeral 710 of FIG. 7, the connection line movement unit 119 may move the connection line 711 in response to the movement to the third point 721.

Then the replacement unit 120 may confirm the positional information of the third point 721 in the second page 212, and generate the second hyperlink data constituted by the positional information of the first point 221, the positional information of the third point 721, the information on the page number of the first page 211, the information on the page number of the second page 212, and 'C:\flexcil\document folder\A.docx' which is the information on the storage path of the second document file, and then replace the first hyperlink data included in the first document file with the second hyperlink data.

That is, when the user 150 changes the second point 222 on the second page 212 to the third point 721 through a predetermined pointing input by viewing the connection line 711, the electronic apparatus 110 may change the hyperlink with the second point 222 set in the first point 221 to the third point 721.

FIG. 8 is a flowchart illustrating an operating method of a touch screen-based electronic apparatus that enables hyperlinks between electronic document based on a touch input according to an embodiment of the present invention.

In step S810, when while a first document file and a second document file among a plurality of document files stored in an electronic apparatus are executed by the user, a first page of a first electronic document corresponding to the first document file and a second page of a second electronic document corresponding to the second document file are simultaneously displayed on a screen, an instruction instructing a hyperlink of a first point of the first page and a second point of the second page to be set is applied from a user, positional information of the first point on the first page, positional information of the second point on the second page, information on a page number of the first page, information on a page number of the second page, and information on a storage path in which the second document file is stored are confirmed.

In step S820, first hyperlink data is generated, which includes the positional information of the first point, the positional information of the second point, the information on the page number of the first page, the information on the page number of the second page, and the information on the storage path of the second document file when the positional information of the first point, the positional information of the second point, the information on the page number of the first page, the information on the page number of the second page, and the information on the storage path of the second document file are confirmed.

In step S830, when the first hyperlink data is generated, the first hyperlink data is added to the first document file.

In step S840, when a load instruction for the first page of the first electronic document is applied by the user after the first hyperlink data is added to the first document file, the first page is loaded and displayed on a screen, and the positional information of the first point in the first hyperlink data included in the first document file is confirmed, and then a predetermined notification indicator indicating that the hyperlink is set on the first point of the first page displayed in the screen is displayed.

In step S850, when the notification indicator is displayed on the first point, and then a display instruction for the hyperlink set in the first point is applied by the user, the information on the storage path of the second document file in the first hyperlink data is confirmed, and the second document file is executed, and the information on the page number of the second page is confirmed in the first hyperlink data and the second page is loaded to simultaneously display the first page and the second page on the screen.

In this case, according to an embodiment of the present invention, in step S830, when the first hyperlink data is generated, a first unique identifier for the first hyperlink data may be generated, the first unique identifier and the first hyperlink data may correspond to each other, and the first unique identifier and the first hyperlink data may be added to the first document file, and at the same time, the first unique identifier may be inserted into page data for the first page.

In this case, in step S840, when the load instruction for the first page of the first electronic document is applied by the user, the first page may be loaded and displayed on the screen, the first hyperlink data included to correspond to the first unique identifier in the first document file may be searched based on the first unique identifier inserted into the page data for the first page, and then the positional information of the first point may be confirmed in the searched first hyperlink data, and a notification indicator indicating that the hyperlink is set on the first point of the first page displayed in the screen may be displayed.

Further, according to an embodiment of the present invention, step S840 may include a step of displaying the notification indicator on the first point of the first page for a predetermined first time, processing the notification indicator to disappear on the first point through a graphic effect when the first time elapsed, displaying the notification indicator on the first point for the first time again when a pointing input is generated from the first point within a predetermined distance by the user after the notification indicator disappears on the first point, and processing the notification indicator to disappear on the first point again through the graphic effect when the first time elapsed.

Further, according to an embodiment of the present invention, step S850 may include a step of locating an input cursor which enables a text input into the second point of the second page when simultaneously displaying the first page and the second page on the screen, and switching, when an editing object is inserted into the second point, the editing object inserted into the second point to a selection state instead of locating the input cursor.

In this case, according to an embodiment of the present invention, the operating method of the electronic apparatus may further include a step of displaying a connection line connecting the first point and the second point on the screen when the first page and the second page are simultaneously displayed on the screen through the step of simultaneously displaying the first page and the second page, a step of moving the connection line in response to the movement to the third point when the second point moves to a third point of the second page by the pointing input of the user in a state in which the first point and the second point are connected by the connection line, and a step of confirming positional information of the third point in the second page, and generating second hyperlink data constituted by the positional information of the first point, positional information of the third point, the information on the page number of the first page, the information on the page number of the second page, and the information on the storage path of the second document file, and then replacing the first hyperlink data included in the first document file with the second hyperlink data.

Hereinabove, the operating method of the electronic apparatus according to an embodiment of the present invention is described with reference to FIG. 8. Here, since the operating method of the electronic apparatus according to an embodiment of the present invention may correspond to the configuration of the operation of the electronic apparatus 110 described by using FIGS. 1 to 7, a more detailed description thereof will be omitted.

The operating method of the electronic apparatus according to an embodiment of the present invention may be implemented by a computer program stored in a storage medium for executing the computer program through coupling with a computer.

Further, the operating method of the electronic apparatus according to an embodiment of the present invention may be implemented in a program instruction type which may be performed through various computer means and recorded in a computer readable medium. The computer readable medium may include a program command, a data file, a data structure, etc., singly or combinationally. The program command recorded in the medium may be specially designed and configured for the present invention, or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. An example of the program command includes a high-level language code executable by a computer by using an interpreter and the like, as well as a machine language code created by a compiler.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from such a disclosure.

Accordingly, the spirit of the present invention should not be defined only by the described exemplary embodiments, and it should be appreciated that claims to be described below and all things which are equivalent to the claims or equivalently modified to the claims are included in the scope of the spirit of the present invention.

The invention claimed is:

1. A touch screen-based electronic apparatus that enables hyperlinks between electronic documents based on a touch input, the touch screen-based electronic apparatus comprising a processor configured to:

confirm unit confirming, when while a first document file and a second document file among a plurality of document files stored in an electronic apparatus are executed by the user, a first page of a first electronic document corresponding to the first document file and a second page of a second electronic document corresponding to the second document file are simultaneously displayed on a screen, an instruction instructing a hyperlink of a first point of the first page and a second point of the second page to be set is applied from a user, positional information of the first point on the first page, positional information of the second point on the second page, information on a page number of the first page, information on a page number of the second page, and information on a storage path in which the second document file is stored;

generate first hyperlink data which includes the positional information of the first point, the positional information of the second point, the information on the page number of the first page, the information on the page number of the second page, and the information on the storage path of the second document file when the positional information of the first point, the positional information of the second point, the information on the page number of the first page, the information on the page number of the second page, and the information on the storage path of the second document file are confirmed;

when the first hyperlink data is generated, add the first hyperlink data to the first document file;

load the first page and display the first page on a screen, confirm the positional information of the first point in the first hyperlink data included in the first document file, and then display a predetermined notification indicator indicating that the hyperlink is set on the first point of the first page displayed in the screen when a load instruction for the first page of the first electronic document is applied by the user after the first hyperlink data is added to the first document file; and when the notification indicator is displayed on the first point, and then a display instruction for the hyperlink set in the first point is applied by the user, confirm the information on the storage path of the second document file in the first hyperlink data, execute the second document file, confirm the information on the page number of the second page in the first hyperlink data and load the second page to simultaneously display the first page and the second page on the screen.

2. The electronic apparatus of claim 1, wherein when the first hyperlink data is generated, a first unique identifier for the first hyperlink data is generated, the first unique identifier and the first hyperlink data correspond to each other, and the first unique identifier and the first hyperlink data are added to the first document file, and at the same time, the first unique identifier is inserted into page data for the first page, and when the load instruction for the first page of the first electronic document is applied by the user, the first page is loaded and displayed on the screen, the notification indicator display unit loads the first page and displays the first page on the screen, searches the first hyperlink data included to correspond to the first unique identifier in the first document file is searched based on the first unique identifier inserted into the page data for the first page, and then the positional information of the first point is confirmed in the searched first hyperlink data, and a notification indicator indicating that the hyperlink is set on the first point of the first page displayed in the screen is displayed.

3. The electronic apparatus of claim 1, wherein the processor is further configured to display the notification indicator on the first point of the first page for a predetermined first time, process the notification indicator to disappear on the first point through a graphic effect when the first time elapsed, display the notification indicator on the first point for the first time again when a pointing input is generated from the first point within a predetermined distance by the user after the notification indicator disappears on the first point, and process the notification indicator to disappear on the first point again through the graphic effect when the first time elapsed.

4. The electronic apparatus of claim 1, wherein the processor is further configured to locate an input cursor which enables a text input into the second point of the second page when simultaneously displaying the first page and the second page on the screen, and switch, when an editing object is inserted into the second point, the editing object inserted into the second point to a selection state instead of locating the input cursor.

5. The electronic apparatus of claim 1, wherein the processor is further configured to:

display a connection line connecting the first point and the second point on the screen when the first page and the second page are simultaneously displayed on the screen;

when the second point moves to a third point of the second page by the pointing input of the user in a state in which the first point and the second point are connected by the connection line, move the connection line in response to the movement to the third point; and confirm positional information of the third point in the second page, generate second hyperlink data constituted by the positional information of the first point, positional information of the third point, the information on the page number of the first page, the information on the page number of the second page, and the information on the storage path of the second document file, and then replace the first hyperlink data included in the first document file with the second hyperlink data.

6. An operating method of a touch screen-based electronic apparatus that enables hyperlinks between electronic documents based on a touch input, the operating method comprising:

confirming, when while a first document file and a second document file among a plurality of document files stored in an electronic apparatus are executed by the user, a first page of a first electronic document corresponding to the first document file and a second page of a second electronic document corresponding to the second document file are simultaneously displayed on a screen, an instruction instructing a hyperlink of a first point of the first page and a second point of the second page to be set is applied from a user, positional information of the first point on the first page, positional information of the second point on the second page, information on a page number of the first page, information on a page number of the second page, and information on a storage path in which the second document file is stored;

generating first hyperlink data which includes the positional information of the first point, the positional information of the second point, the information on the page number of the first page, the information on the page number of the second page, and the information on the storage path of the second document file when the positional information of the first point, the positional information of the second point, the information on the page number of the first page, the information on the page number of the second page, and the information on the storage path of the second document file are confirmed;

when the first hyperlink data is generated, adding the first hyperlink data to the first document file;

loading the first page and displaying the first page on a screen, confirming the positional information of the first point in the first hyperlink data included in the first document file, and then displaying a predetermined notification indicator indicating that the hyperlink is set on the first point of the first page displayed in the screen when a load instruction for the first page of the first electronic document is applied by the user after the first hyperlink data is added to the first document file; and when the notification indicator is displayed on the first point, and then a display instruction for the hyperlink set in the first point is applied by the user, confirming the information on the storage path of the second document file in the first hyperlink data, executing the second document file, confirming the information on the page number of the second page in the first hyperlink data and loading the second page to simultaneously display the first page and the second page on the screen.

7. The operating method of an electronic apparatus of claim 6, wherein in the adding, when the first hyperlink data is generated, a first unique identifier for the first hyperlink data is generated, the first unique identifier and the first hyperlink data correspond to each other, and the first unique identifier and the first hyperlink data are added to the first document file, and at the same time, the first unique identifier is inserted into page data for the first page, and in the displaying of the notification indicator, when the load instruction for the first page of the first electronic document is applied by the user, the first page is loaded and displayed on the screen, the first hyperlink data included to correspond to the first unique identifier in the first document file is searched based on the first unique identifier inserted into the page data for the first page, and then the positional information of the first point is confirmed in the searched first hyperlink data, and a notification indicator indicating that the hyperlink is set on the first point of the first page displayed in the screen is displayed.

8. The operating method of an electronic apparatus of claim 6, wherein the displaying of the notification indicator includes displaying the notification indicator on the first point of the first page for a predetermined first time, processing the notification indicator to disappear on the first point through a graphic effect when the first time elapsed, displaying the notification indicator on the first point for the first time again when a pointing input is generated from the first point within a predetermined distance by the user after the notification indicator disappears on the first point, and processing the notification indicator to disappear on the first point again through the graphic effect when the first time elapsed.

9. The operating method of an electronic apparatus of claim 6, wherein the simultaneously displaying of the first page and the second page includes locating an input cursor which enables a text input into the second point of the second page when simultaneously displaying the first page and the second page on the screen, and switching, when an editing object is inserted into the second point, the editing object inserted into the second point to a selection state instead of locating the input cursor.

10. The operating method of an electronic apparatus of claim 6, further comprising:

displaying a connection line connecting the first point and the second point on the screen when the first page and the second page are simultaneously displayed on the screen;

when the second point moves to a third point of the second page by the pointing input of the user in a state in which the first point and the second point are connected by the connection line, moving the connection line in response to the movement to the third point; and confirming positional information of the third point in the second page, generating second hyperlink data constituted by the positional information of the first point, positional information of the third point, the information on the page number of the first page, the information on the page number of the second page, and the information on the storage path of the second document file, and then replacing the first hyperlink data included in the first document file with the second hyperlink data.

11. A non-transitory computer readable recording medium having a program recorded therein for allowing a computer to execute an operating method of a touch screen-based electronic apparatus that enables hyperlinks between electronic documents based on a touch input, the operating method comprising:

confirming, when while a first document file and a second document file among a plurality of document files stored in an electronic apparatus are executed by the user, a first page of a first electronic document corresponding to the first document file and a second page of a second electronic document corresponding to the second document file are simultaneously displayed on a screen, an instruction instructing a hyperlink of a first point of the first page and a second point of the second page to be set is applied from a user, positional information of the first point on the first page, positional information of the second point on the second page, information on a page number of the first page, information on a page number of the second page, and information on a storage path in which the second document file is stored;

generating first hyperlink data which includes the positional information of the first point, the positional information of the second point, the information on the page number of the first page, the information on the page number of the second page, and the information on the storage path of the second document file when the positional information of the first point, the positional information of the second point, the information on the page number of the first page, the information on the page number of the second page, and the information on the storage path of the second document file are confirmed;

when the first hyperlink data is generated, adding the first hyperlink data to the first document file;

loading the first page and displaying the first page on a screen, confirming the positional information of the first point in the first hyperlink data included in the first document file, and then displaying a predetermined notification indicator indicating that the hyperlink is set on the first point of the first page displayed in the screen when a load instruction for the first page of the first electronic document is applied by the user after the first hyperlink data is added to the first document file; and when the notification indicator is displayed on the first point, and then a display instruction for the hyperlink set in the first point is applied by the user, confirming the information on the storage path of the second document file in the first hyperlink data, executing the second document file, confirming the information on the page number of the second page in the first hyperlink data and loading the second page to simultaneously display the first page and the second page on the screen.

* * * * *